US005575863A

United States Patent [19]

Sala et al.

[11] Patent Number: 5,575,863

[45] Date of Patent: Nov. 19, 1996

[54] PROCESS FOR THE CHEMICAL CLEANING OF METAL COMPONENTS

[75] Inventors: Béatrice Sala, Jonzieux; Angel Gelpi, Paris, both of France

[73] Assignee: Framatome, Courbevoie, France

[21] Appl. No.: 281,991

[22] Filed: Jul. 29, 1994

[30] Foreign Application Priority Data

Jul. 29, 1993 [FR] France .................................. 93 09360

[51] Int. Cl.$^6$ .............................. C23G 1/00; C23G 1/02; C02F 5/08; C02F 5/12

[52] U.S. Cl. .................................... 134/2; 134/3; 134/41; 510/247; 510/253; 510/270; 510/257; 510/245; 510/505; 510/508

[58] Field of Search .............. 134/2, 3, 41; 252/174.19, 252/544, 547, 82, 83

[56] References Cited

U.S. PATENT DOCUMENTS

| | | | |
|---|---|---|---|
| 3,148,150 | 9/1964 | De Groote et al. | 252/82 |
| 3,664,870 | 5/1972 | Oberhofer et al. | 134/3 |
| 4,666,528 | 5/1987 | Arrington et al. | 252/82 |
| 4,793,865 | 12/1988 | Staley et al. | 134/2 |
| 5,322,636 | 6/1994 | Schaper | 252/82 |

FOREIGN PATENT DOCUMENTS

| | | | |
|---|---|---|---|
| 718380 | 9/1965 | Canada | 252/82 |
| 3431101 | 3/1986 | Germany . | |
| 58-92499 | 6/1983 | Japan . | |

OTHER PUBLICATIONS

Patent Abstracts of Japan—vol. 7, No. 191 (C–182) (1336) Aug. 20, '83 & JP–A–58 092 499 (Nippon Noyaku) Jun. 1, 1983—Abstract–.

Patent Abstracts of Japan—vol. 11, No. 242 (C–438) (2689) Aug. 7, '87 & JP–A–62 050 489 (Kawasaki Steel) Mar. 5, 1987—Abstract–.

Patent Abstracts of Japan—vol. 4, No. 173(C–32) (655) Nov. 29, '80 & JP–A–55 109 498 (Ichirou Kudou) Aug. 22, 1980—Abstract–.

Patent Abstracts of Japan–vol. 8, No. 118(C–226) (1555) May 31, '84 & JP–A–59 029 093 (Doryokuro Kakunenryo Kaihatsu) Feb. 16, 1984 —Abstract–.

*Primary Examiner*—Zeinab El-Arini
*Attorney, Agent, or Firm*—Pollock, Vande Sande & Priddy

[57] ABSTRACT

A process for chemical cleaning of metal components having an iron oxide deposit upon a layer of compounds having a high silica content. The process includes the step of preparing an aqueous mixture including an agent for complexing $Si(OH)_4$ and at least one compound for dissolving the high silica content layer. The dissolving compound is selected from the group consisting of insertion compounds for inserting OH or F ions in the $Si(OH)_4$ and OH-containing organic compounds. The insertion compounds including electrophilic groups and are selected from the group consisting of conjugated unsaturated systems and unsaturated N-oxide compounds. The OH-containing organic compounds are selected from the group consisting of organic compounds having at least one alcohol function, aromatic amines, soluble salts of tertiary amines, and aromatic amines causing condensation of OH radicals onto silica. The process also includes the step of contacting the metal component with the aqueous medium until the high silica content layer has been dissolved.

11 Claims, No Drawings

PROCESS FOR THE CHEMICAL CLEANING OF METAL COMPONENTS

FIELD OF THE INVENTION

The present invention relates to cleaning of metal components on which a deposit which is harmful to the characteristics of the component has formed. The deposit contains oxides (in particular iron oxide in the form of magnetite) following exposure to liquid and/or steam water at high temperature. More particularly, the invention relates to chemical cleaning of components that have been exposed to water, at high temperature, containing iron and silicon compounds, as well as other elements, such as Na, Ca, K, Al, Zn, Cu, As, Sb, Tl, Pb, C, S, Ni, Cr and Sn.

The invention finds a particularly important application in the leaching of the faces of the steam-generating tubes of nuclear power plants that are exposed to the secondary circuit. In the tubes, water containing pollutant chemical elements of various origins circulates. For example, the pollutant chemical elements could arise from leaks in the condenser, from the ion-exchange resins used for the demineralization, from the water treatment products, and from the corrosion of elements of the secondary circuit. Deposits are also formed on the straight parts of the exchange tubes and in the interstices, in particular between the tubes and the cross-struts. The interstices may be distributed along the tubes and intended to keep them constant with respect to one another, as well as between the tubes and the tube plate.

The invention may, however, also be applied to any metal component on which a deposit similar to those occurring in such steam exchangers is formed.

BACKGROUND OF THE INVENTION

It has long been known that the formation of an oxidized layer, generally in the form of magnetite, on the surface of the exchange tubes decreases the performance of the exchanger and, moreover, promotes inter-granular corrosion and the appearance of stress cracks. Consequently, it is common periodically to remove the magnetite by leaching the tubes. Various cleaning agent types are known, generally acting by reduction and then complexation of the magnetite. In particular, a cleaning process by reduction using $N_2H_4$, followed by complexation of the $Fe^{2+}$ to a compound of $Fe^{3+}$ using ethylenediaminetetraacetic acid, has been used. The various well-known processes which exist will not be described in the present application.

Analyses carried out on samples of exchanger tubes bearing deposits have demonstrated that the structure of these deposits was much more complex than was imagined. They have in particular shown that, if the deposit consists mainly of magnetite, there may, locally, be silicates present on an alveolar silico-aluminate having a solid gel structure. The silicates may contain carbon-containing products insofar as this element is present in the medium. The oxidized passivation layer which is conventionally produced during the final phase of manufacture of the exchange tubes is destroyed under the alveolar silico-aluminate and is substituted there by a relatively thick, non-protective layer. The analysis showed that this layer has a high content of chromium and of iron in the usual case where the exchange tubes are formed from one of the nickel-chromium alloys also containing iron and other addition elements, referred to by the brand name "INCONEL". It is also liable to exist, with a lesser thickness, under the magnetite in the straight parts of the tubes.

SUMMARY OF THE INVENTION

It is an object of the present invention to provide a process for cleaning the deposits which are liable to occur under these conditions. It proposes, with this aim, a process for the chemical cleaning of metal components bearing a deposit comprising compounds with a high content of silica and metal oxides, in particular magnetite. According to the process the superficial metal oxides are removed by a complexation. The complexation may be preceded by a reduction. The complexation is followed by dissolution of the siliceous compounds by an insertion reaction, in an aqueous medium, with electrophilic compounds. Alternatively, the insertion reaction may be carried out with heteropolyacids, for example. Alternatively, the complexation may be followed by a condensation reaction that is intended to weaken the bonds. The condensation reaction may be carried out in particular with alcohols or amines, in a medium that ensures the complexation of $Si(OH)_4$.

After leaching of the tubes in order to rid them of the magnetite and of the siliceous compounds, a repassivation operation will generally be carried out. The repassivation may be carried out by surface oxidation with drying and dehydroxylation. Drying at a temperature of about 300° C. for 24 to 48 hours in a dry oxidizing atmosphere may, in particular, be used.

DETAILED DESCRIPTION OF THE INVENTION

Before describing possible embodiments of the invention, it may be useful to give an account of the most likely mode of formation of siliceous compounds in the deposit. Silica, in the dissolved state in an aqueous phase, in $Si(OH)_4$ form, binds to the metal by the intervention of the $OH^-$ ions present at the surface of the metal M. The $OH^-$ ions have a catalytic effect. The reactions may be represented diagrammatically in the form:

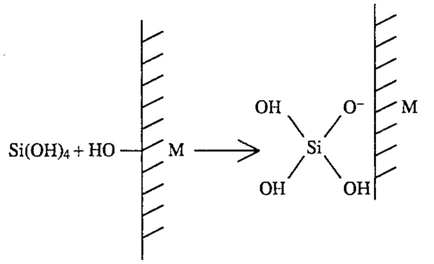

Finally, there is formation of a deposit containing bonds of the type:

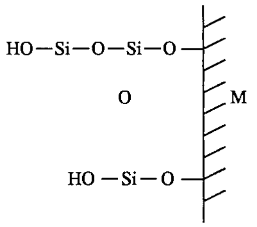

Additional species such as $AlO_4^-$ may be inserted in the network of the deposit thus formed. These additional species give a negative ionic nature to the surface deposit. This negative nature may be automatically compensated for by the absorption of cations present in the aqueous phase, such as $Ca^{2+}$, $NH_4^+$, $K^+$ or cations arising from the corrosion of the metal component itself.

One characteristic which makes the deposits particularly difficult to strip off is that the Si—O bond is one of the strongest silicon bonds which exists; it comes immediately after Si—F in order of decreasing energy.

The process of cleaning a tube starts by removal of the magnetite, by any one of the known processes.

The second step consists of the removal of the remaining deposits, especially containing siliceous compounds, by treatment with chemical compounds favouring the delocalization of the Si—O-metal bonding electrons and their loosening.

In practice, it is possible to act:

either by insertion of elements giving rise to an increase in the coordination number of the silica, typically using electrophilic compounds, or by condensation of —OH groups onto the silica.

It is advantageous to use a medium that promotes complexation of the silica and that prevents $Si(OH)_4$ returning to the $SiO_2$ state and prevents it rebinding to the metal.

These two modes of dissolution will now be detailed.

Aqueous dissolution by insertion and increase of the coordination number of the silica This approach makes use of the fact that soluble compounds may be obtained in the siliceous network of the layer to be destroyed by inserting therein:

$OH^-$ in an alkaline medium, in order to form $Si(OH)_4$, $F^-$ in an acidic medium, in order to form $SiF_6^{2-}$ in particular.

In principle, various acids and strong bases could be used. However, the concentration required raises a problem of corrosion of the majority of the metal supports to be cleaned. This is particularly the case for tubes made of "Inconel". On the other hand, unsaturated systems having electrophilic properties may be used, among which there may be mentioned:

1. conjugated unsaturated systems such as:

substituted phenyl groups, for example mono-, di- or triphenyl, certain groups containing several benzene ring-systems.

2. Unsaturated N-oxide compounds such as:

hydroxypyridine:

poly(2-vinylpyridine), 1-hydroxypyridine, 2-hydroxypyridine-1-oxide.

Generally speaking, compounds or systems may be used which contain electrophilic groups such as:

—$CO_2H$

C═N.

These compounds will be used in an aqueous phase, with an insertion compound content and at a treatment temperature which are chosen depending on the compounds. Generally speaking, there is advantage in working at the highest temperature which is compatible with the physical or chemical stability of the compounds.

It is advantageous to add a complexing product to the aqueous phase and, with this aim, heteropolyacids and salts thereof, in particular alkali metal molybdates, may especially be used. There may be mentioned ammonium heptamolybdate which, in an acidic medium of pH between 1 and 5, reacts with $Si(OH)_4$:

$$7\ Si(OH)_4 + 12\ H_6Mo_7O_{24}\ ^{-}4\ H_2O + 174\ H_2O \rightarrow 7\ H_4Si(Mo_2O_7)_6\ ^{-}28\ H_2O$$

The silica is thus maintained in coordination state +6 and its repolymerization is avoided.

Boric acid may be added in order to maintain a pH between 1 and 5. $F^-$ ions may be added in order to promote dissolution of the silica.

Aqueous dissolution by condensation of OH groups onto the silica.

This approach, which amounts to an esterification, makes use of the fact that silicon compounds having silanol functional group Si—OH, which are more acidic than alcohols R—OH (R being a carbon-containing radical and usually an alkyl radical), give strong hydrogen bonds which bring about condensations within the layer, in an acidic or basic medium, that is to say in the presence of $H^+$ or $OH^-$ ions. This is particularly the case of many organosilicon compounds.

A representative reaction is of the type:

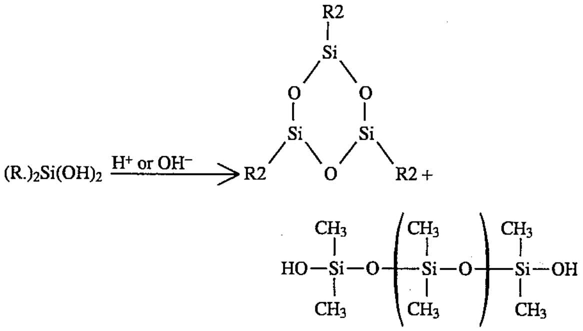

where R and R2 denote carbon-containing radicals, generally alkyl as for R.

It is observed that the silica passes in particular to the state of polysiloxane. The compounds finally obtained are fluid, even at low temperature, insofar as the elements of the deposit do not have an excessive number of carbon atoms and do not result in chains which are too long.

Such condensation reactions may be obtained by numerous organic compounds.

A certain number of these will now be mentioned by way of examples.

1. Many organic compounds having one or more alcohol functional groups, optionally coupled with unsaturations, may be used. There may, in particular, be mentioned methyl, ethyl and butyl alcohol. These alcohols may be used in a very wide concentration range, of between 5 and 95%. However, a concentration of between 5 and 30% will generally be used.

20% cis-2-butene-1,4-diol promotes disintegration of the siliceous network of the gel.

2. Numerous amines may also be used, as well as the soluble salts thereof. There may, in particular, be mentioned aromatic amines and the soluble salts of tertiary amines, in particular ammonium salts.

More generally, amines will be selected that give rise to groups of the form:

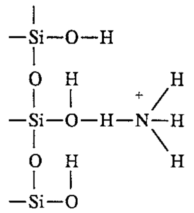

where - denotes a H bond

Once the silica-based layer has been destroyed, it is generally necessary to repassivate the base metal. This may be achieved conventionally by oxidation with drying and dehydroxylation. The drying-oxidation may be performed at 290°–300° C. for 24 to 48 hours with flushing by a dry oxidizing gas, for example a gas consisting of dry air or of oxygen-enriched air.

A few examples of implementation of the invention on test pieces will now be given.

The treated test pieces consisted of a section made of "Inconel" bearing various layers; in particular, the majority bearing a layer of approximately 100 μm of magnetite and, in certain zones, a siliceous coating overlaid with a layer of magnetite.

EXAMPLE 1

Condensation by (mono, di, tri)phenols

Generally speaking, these compounds may be used in aqueous ammonia solution form with or without ammonium fluoride, which has an insertion role.

In particular, the solutions used contained 1 mol per liter of aqueous ammonia, 20 to 300 g/l of phenol and from 0 to 100 g/l of ammonium fluoride $NH_4F$, for tests on test pieces made of Inconel coated beforehand with aluminosilicate gel and on samples originating from a French nuclear power plant steam generator, containing deposits of magnetite and of aluminosilicate.

The temperatures used varied from 80° to 150° C. so as to obtain the best dissolution without corroding the base metal. For example, one test consisted of placing the solution and the test piece, already freed of the magnetite, in a reactor containing a magnetic stirrer. The reactor was heated to 100° C. and the vapors released were condensed in a column and returned to the reactor. At the end of six hours, the test piece was rinsed in hot 1M $NH_3$ solution for 15 to 20 minutes, then rinsed in ethanol with ultrasonic agitation and finally dried using compressed air.

Other tests were performed in a glass reactor for temperatures below 100° C. and in an autoclave for the tests at temperatures above 100° C. The test times varied between 2 h and 6 h. Phenol, pyrocatechol and pyrogallol gave good results. Pyrocatechol was used in a proportion of 300 g to 25 g/l, between the boiling point and 150° C., with and without ammonium fluoride, for a time of 4 h to 5 h.

Examination by scanning electron microscopy showed that the siliceous layer had been removed.

Similar results were obtained with other similar compounds, for example 1,2,3-triphenol.

EXAMPLE 2

Condensation by ethanol with complexation by molybdate

A solution was prepared containing 20% of ethanol, 10 g per liter of boric acid and 100 g per liter of ammonium molybdate in distilled water. The solution was then placed in a reactor and maintained at 80° C. for seven hours. The test piece was subsequently rinsed in ethanol with the application of ultrasound, then dried using compressed air. Examination by electron microscopy again revealed that the silica layer had been destroyed.

A possible embodiment of the invention for the chemical cleaning of the external face of the tubes of a steam generator for a pressurized-water reactor will now be described.

The first phase of the process is intended to remove the magnetite present on the tubes and on the cross-strut plates.

The secondary circuit of the steam generator is filled with water the temperature of which is increased, for example by circulation of water at high temperature in the primary circuit. The reactants (EDTA) are injected into the filling water which is brought to the usual pH for the leaching of magnetite. The water charged with reactants is placed in circulation, at a flow rate which will often be approximately 150 $m^3$ per hour for a typical nuclear power plant steam generator, in order to entrain the magnetite from the cross-strut plates. It is advantageous also to inject a flow of nitrogen, which is intended to activate the effect of the solution in the interstices between the tubes and the cross-strut plates.

The second step, of removal of the siliceous compounds, may follow directly on from the first insofar as the products used for the insertion or the condensation, chosen from those mentioned above, are compatible with the products used during the first phase. In the case of incompatibility the secondary circuit of the steam generator is emptied, then filled again and heated. The insertion or condensation components, intended to remove the siliceous deposit by solubilization, are injected. The solution is placed in circulation with injection of nitrogen in order to promote solubilization in the interstices. After destruction of the layer of the passages and dissolution of the silicates, the generator is emptied.

The passivation may be carried out by filling with water, establishing the temperature and bubbling oxygen in, in order to bring the oxidation potential measured at the saturated calomel electrode above 350 mV. Finally, the steam generator may be emptied and dried before storage.

We claim:

1. A process for chemical cleaning of metal components having an iron oxide deposit upon a layer of compounds having a high silica content, said process comprising the steps of:

(a) preparing an aqueous mixture including an agent for complexing $Si(OH)_4$ and at least one compound for dissolving said layer of compounds having a high silica content selected from the group consisting of:

insertion compounds for inserting OH or F ions in said $Si(OH)_4$, said insertion compounds including electrophilic groups and being selected from the group consisting of conjugated unsaturated systems and unsaturated N-oxide compounds; and OH-containing organic compounds selected from the group consisting of: organic compounds having at least one alcohol function, aromatic amines, soluble salts of tertiary amines, and aromatic amines causing condensation of OH radicals onto silica; and (b) contacting said metal components with said aqueous mixture until said layer of compounds having a high silica content has been dissolved.

2. Process according to claim 1, comprising a preliminary step of chemical reduction.

3. Process according to claim 1, further comprising a final step of repassivation by oxidation and dehydroxylation.

4. A process according to claim 3, wherein said oxidation and de-hydroxylation are carried out by bubbling oxygen in said aqueous mixture.

5. A process according to claim 1, wherein said complexing agent is molybdate.

6. A process according to claim 5, wherein said molybdate is ammonium hepta-molybdate.

7. A process according to claim 1, wherein said soluble salts of tertiary amines are ammonium salts.

8. A process according to claim 1, wherein said conjugated unsaturated systems include substituted phenyl groups or a plurality of benzene rings.

9. A process according to claim 8, wherein said substituted phenyl groups are selected from the group consisting of monophenol, diphenol and triphenol.

10. A process according to claim 1, wherein said at least one compound for dissolving is selected from the group consisting of phenol, pyrocatechol, and pyrogallol.

11. A process for chemical cleaning faces of steam generating tubes of a nuclear power plant, said faces being exposed to a secondary circuit of the nuclear power plant, said exposed faces bearing an iron oxide deposit on a layer of compounds having a high silica content, said process comprising the steps of:

(a) preparing an aqueous medium including an agent for complexing $Si(OH)_4$ and at least one compound for dissolving said layer of compounds having a high silica content selected from the group consisting of:

insertion compounds for inserting OH or F ions in said $Si(OH)_4$, said insertion compounds including electrophilic groups and being selected from the group consisting of conjugated unsaturated systems and unsaturated N-oxide compounds; and OH-containing organic compounds selected from the group consisting of: organic compounds having at least one alcohol function, aromatic amines, soluble salts of tertiary amines, and aromatic amines causing condensation of OH radicals onto silica; and (b) contacting said faces with said aqueous medium until said layer of compounds having a high silica content has been dissolved.

* * * * *